United States Patent
Riopka et al.

(10) Patent No.: US 9,858,466 B2
(45) Date of Patent: Jan. 2, 2018

(54) BIOMETRIC FEATURE EXTRACTION USING MULTIPLE IMAGE INSTANTIATIONS

(75) Inventors: Taras P. Riopka, Concord, MA (US); Pranab Mohanty, Woburn, MA (US); Limin Ma, Lowell, MA (US)

(73) Assignee: AWARE, INC., Bedford, MA (US)

( * ) Notice: Subject to any disclaimer, the term of this patent is extended or adjusted under 35 U.S.C. 154(b) by 0 days.

(21) Appl. No.: 13/698,448

(22) PCT Filed: May 26, 2011

(86) PCT No.: PCT/US2011/038122
§ 371 (c)(1),
(2), (4) Date: Nov. 16, 2012

(87) PCT Pub. No.: WO2011/150197
PCT Pub. Date: Dec. 1, 2011

(65) Prior Publication Data
US 2013/0064434 A1    Mar. 14, 2013

Related U.S. Application Data

(60) Provisional application No. 61/348,814, filed on May 27, 2010.

(51) Int. Cl.
G06F 9/00     (2006.01)
G06K 9/00     (2006.01)
G06K 9/62     (2006.01)

(52) U.S. Cl.
CPC ..... *G06K 9/00073* (2013.01); *G06K 9/00026* (2013.01); *G06K 9/6255* (2013.01)

(58) Field of Classification Search
CPC .................................................. G06K 9/00026
(Continued)

(56) References Cited

U.S. PATENT DOCUMENTS 6,185,318 B1    2/2001 Jain et al.
6,546,122 B1    4/2003 Russo
(Continued)

FOREIGN PATENT DOCUMENTS

JP    10-149446    6/1998
KR    10-0467279 B1    1/2005
(Continued)

OTHER PUBLICATIONS

Dong-Hyeok Jang, KR100467279, publication date Jan. 24, 2005, translation provided by USPTO STIC.*
(Continued)

*Primary Examiner* — Mark Roz
(74) *Attorney, Agent, or Firm* — Jason H. Vick; Sheridan Ross, PC

(57) ABSTRACT

Systems and methods acquire and/or generate multiple different images of the same biometric identity, identify specific instances of biometric features in each of the different images, and merge the identified specific instances of biometric features into a data record that provides a digital representation of the biometric identity. Examples of biometric identities include fingerprints, handprints, palm prints, and thumbprints. In one embodiment, a counter is associated with each specific instance of a biometric feature found in the multiple images. Specific instances of biometric features found most frequently have high counts and are indicative of true identifications; those with low counts are indicative of false identifications. A threshold distinguishes between true and false identifications. Those specific instances with counts below the threshold are excluded when the digital representation of the biometric identity is generated. Thus, the methodology eliminates false identifications of specific instances of biometric features while accentuating true identifications.

26 Claims, 7 Drawing Sheets

(58) Field of Classification Search
USPC .................................................. 382/124–127
See application file for complete search history.

(56) References Cited

U.S. PATENT DOCUMENTS

| | | |
|---|---|---|
| 2001/0031075 A1 | 10/2001 | Fujii |
| 2005/0152584 A1 | 7/2005 | Svedin |
| 2008/0304389 A1 | 12/2008 | Den Hollander |
| 2010/0021014 A1 | 1/2010 | Bebis |
| 2010/0046812 A1 | 2/2010 | Maurer et al. |

FOREIGN PATENT DOCUMENTS

| | | |
|---|---|---|
| KR | 10-2008-0110242 A | 12/2008 |
| WO | WO 03/085591 | 10/2003 |

OTHER PUBLICATIONS

Cappelli (Cappelli, et al, Fingerprint Image Reconstruction from Standard Templates, IEEE Sep. 2007).*
Uz et al, Minutiae-based template synthesis and matching for fingerprint authentication, Elsevier 2009.*
International Search Report and Written Opinion for counterpart international patent application No. PCT/US2011/038122, dated Jan. 5, 2012, KIPO; 9 pages.
International Preliminary Report on Patentability for counterpart international patent application No. PCT/US2011/038122, dated Nov. 27, 2012, WIPO; 5 pages.
Uz, Tamer et al. "Minutiae-Based Template Synthesis and Matching for Fingerprint Authentication" Elsevier, Computer Vision and Image Understanding, 113, 2009, pp. 979-992.
European Search Report for European Application No. 11787406.5, dated Mar. 20, 2017.

* cited by examiner

D

C

B

A

BIOMETRIC FEATURE EXTRACTION USING MULTIPLE IMAGE INSTANTIATIONS

RELATED APPLICATION

This application is a national stage application under 35 U.S.C. 371 of PCT Application No. PCT/US2011/038122 having an international filing date of May 26, 2011, which designated the United States, which PCT application claims the benefit of U.S. Provisional Application No. 61/348,814, filed on May 27, 2010, titled "Robust Biometric Feature Extraction using Multiple Image Instantiations," each of which are incorporated herein by reference in their entirety.

FIELD OF THE INVENTION

The invention relates generally to person identification. More specifically, the invention relates to systems and methods of biometric feature extraction from image instantiations.

BACKGROUND

Fingerprints, an example of which appears in FIG. 1, are a powerful biometric because of the uniqueness and stability of the feature signature of the human fingerprint pattern. The last decade has seen an improvement in the ability of automated image analysis systems to extract features from fingerprint patterns quickly, accurately, and consistently. All of these factors have contributed to the success of fingerprints as a biometric for person identification systems.

Person identification using fingerprints involves several steps. A first step involves fingerprint image acquisition, with the goal being the accurate reproduction of the fingerprint pattern in digital image form. A subsequent step is the accurate extraction of fingerprint features, known to be unique for every individual, from the digital image. In a later step, the pattern of these features is used to search through a database of patterns to determine the optimal match, and hence, to identify the correct individual.

The features used for identification are known as Galton details or minutiae, and relate to the location of points centered on specific patterns formed by the ridges, which appear as black lines in the fingerprint image of FIG. 1, and valleys, which appear as white lines. The comparison of the relative positions of these points with a reference fingerprint determines the degree to which a given unknown pattern matches the reference fingerprint.

There is a variety of different types of minutiae. FIG. 2 shows four of the most common types, isolated by encircling in white: A) Island; B) Dot; C) Bifurcation; and D) Ending Ridge. An average fingerprint may have 20 to 40 minutia points, although fingerprints of poor quality may have as few as 3 or 4, and fingerprints that are "rolled" to imprint more surface area of the finger may have as many as 100 or more. The specific two-dimensional layout of the minutia points uniquely characterizes an individual. Clearly, the more minutia points that are correctly located, the greater the probability that a given fingerprint will be accurately matched against its reference fingerprint in a given database. The goal in biometric systems is to maximize that probability; therefore, accurate feature extraction is central to this goal.

The examples of FIG. 2 seem to be quite clear. However, in practice, fingerprint images are significantly more degraded than those shown in FIG. 2 and the location (and even the type) of minutiae much more ambiguous. FIG. 3 shows examples of real minutiae and demonstrates the inherent uncertainty in an image, leading to problematic decisions for both experts and automated algorithms. For example, in FIG. 3, the magnified area 2 contains numerous points in the image that might be considered as ending ridges or dots. However, expert examination in the magnified area reveals only two minutiae; minutia point 4, which is a definite bifurcation 6; and minutia point 8 that, despite careful examination, is ambiguous, especially if the larger context of a ridge flow is considered. In fact, minutia point 8 can be considered a bifurcation 10 or an ending ridge (or even dot) 12 depending on whether the break in the arm is due to poor image quality or due to a real physical break. In other words, it is unknown whether the break is a physical characteristic of the fingerprint or an artifact of the image acquisition/analysis process because of inherent uncertainty in the image itself.

In instances of ambiguity, minutia extraction algorithms may do one of four things: 1) correctly locate a true minutia, yielding optimal results; 2) fail to locate a true minutia, which can weaken the probability of a subsequent match; 3) incorrectly locate a false minutia, which can later confuse the matching algorithm; or 4) correctly locate a true minutia but misidentify the minutia type, resulting in a minor position offset that can sometimes appear as a missed true minutia and an incorrectly located false minutia (a hybrid of (2) and (3)—both weakening the probability of a match and confusing the matching algorithm).

The acquisition of fingerprint images of fingerprints can occur in many different ways. Irrespective of how the image is acquired, however, the image formation process is known to result in an inherently flawed recreation of the actual fingerprint. The flawed recreation occurs because of several reasons:

1. Image Deformation. Most fingerprint scanning devices require the subject either to press their finger onto a platen or to brush their finger against a scanning device. Because of the elasticity of skin and varying quantity of finger pressure, in both cases the fingerprint pattern can be slightly deformed, with slightly different deformations with each image acquisition.

2. Image Superposition. Dirty or oily fingers can leave behind residual fingerprints on a platen. If the platen is not cleaned between scans, as is too often the case, images of these residual prints can superimpose themselves on the scanned fingerprint.

3. Image Distortion. The image acquisition process relies on some method that measures the physical differences between ridges and valleys. Whether that means measuring capacitance, reflected sound, reflected radiation emitted radiation, or the like, the projection of an irregular 3-D object (the finger) onto a 2D flat plane inevitably introduces image distortions.

4. Image Resolution. Because of the relatively small size of minutiae, image resolution is a critical factor in facilitating accurate automatic detection. Higher resolution can yield superior definition, but in practice, resolution is often limited by cost and the technology available.

SUMMARY

In one aspect, the invention features a method of extracting biometric features from images of a biometric identity. The method comprises acquiring multiple different images of a same biometric identity, identifying specific instances of biometric features in each of the multiple different images of the same biometric identity, and merging the specific instances of biometric features identified in the multiple different images of the same biometric identity into a data record that provides a digital representation of the biometric identity.

In another aspect, the invention features a computer program product for extracting biometric features from images of a biometric identity. The computer program product comprises a computer readable persistent storage medium having computer readable program code embodied therewith. The computer readable program code comprises computer readable program code configured to acquire, if executed, multiple different images of a same biometric identity, computer readable program code configured to identify, if executed, specific instances of biometric features in each of the multiple different images of the same biometric identity, and computer readable program code configured to merge, if executed, the specific instances of biometric features identified in the multiple images of the same biometric identity into a data record that provides a digital representation of the biometric identity.

In still another aspect, the invention features a system for extracting biometric features from images of a biometric identity. The system includes means for acquiring multiple different images of a same biometric identity. A processor is programmed to run computer readable program code that identifies, if executed, specific instances of biometric features in each of the multiple different images of the same biometric identity and merges the identified specific instances of biometric features into a data record that provides a digital representation of the biometric identity. Memory is configured to store a list of specific instances of biometric features that are being merged into the data record.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Conventional systems focus on achieving robust, accurate, and consistent feature extraction from a single image. Technological advancements and the development of numerous standards have made image acquisition a fairly robust and repeatable process, enabling relatively accurate matching among thousands and even millions of fingerprints. Not all fingerprint features are expected to be found in every fingerprint image, but because of the large number of minutia in any single fingerprint pattern, a large enough subset of features is often found to enable accurate matching to a degree, provided the quality of the original fingerprint is sufficiently high. However, as the quality of the original fingerprint degrades, the detrimental effect upon matching resulting from this lack of precise repeatability becomes more egregious.

To address this issue, the biometric feature extraction systems and methods described herein provide a methodology for improving the robustness, accuracy, and repeatability of feature extraction from digital images by combining information from the analysis of multiple instantiations of the same biometric identity. Although described primarily in connection with fingerprint images, the principles described herein can be applied to other biometric identities, including, but not limited to eyes, handprints, footprints, palm prints, thumbprints, and faces.

The multiple instantiations of the same biometric identity can be the result of a physical perturbation in the image formation process (e.g., a slight change in finger pressure during fingerprint scanning) of a synthetic or simulated perturbation using image-processing techniques. Specific instances of biometric features are extracted from the multiple different images, identified, and merged into a data record, such as a fingerprint template. In one embodiment, a fingerprint template consists of minutia location and angle data, with sufficient information for effective matching. The data record provides a digital representation of the biometric identity. The more accurate the digital representation, the more likely the biometric identity can be successfully matched.

In one embodiment, a counter is associated with each specific instance of a biometric feature found in the multiple images. Specific instances of biometric features found most frequently will have high counts and are indicative of true identifications; those with low counts are indicative of false identifications. Use of a threshold can distinguish between the true and false identifications; specific instances of biometric features with counts below the threshold are excluded when the digital representation of the biometric identity (i.e., the data record) is generated. Accordingly, a methodology described herein operates to eliminate the false identifications while accentuating the true identifications.

Figure 1:
FIG. 1 is an image of a fingerprint.
Figure 2:
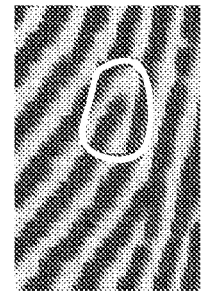
FIG. 2 is a set of images showing four different types of minutiae commonly found in fingerprints.
Figure 2:
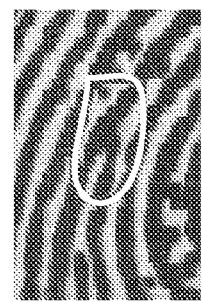
Figure 2:
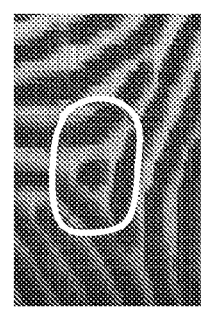
Figure 2:
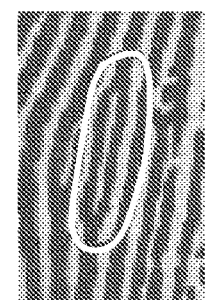
Figure 3:
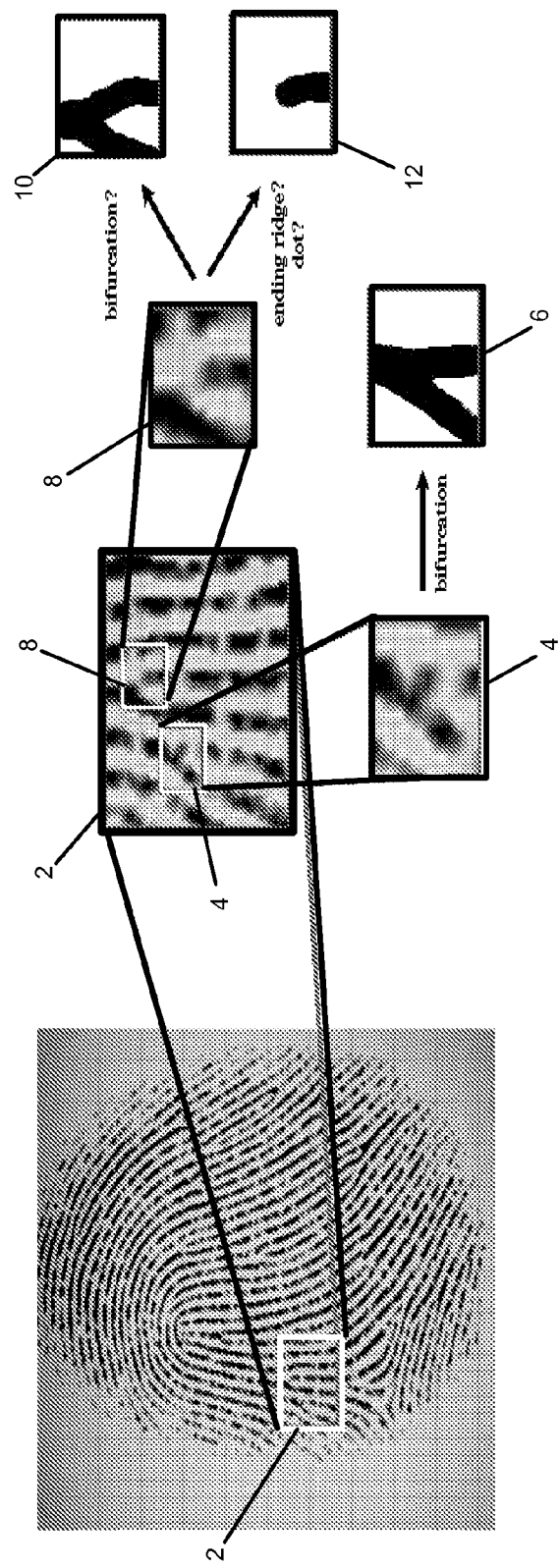
FIG. 3 is an image of a fingerprint in which the ridges and valleys are less than optimally defined, demonstrating an inherent uncertainty in an image.
Figure 4:
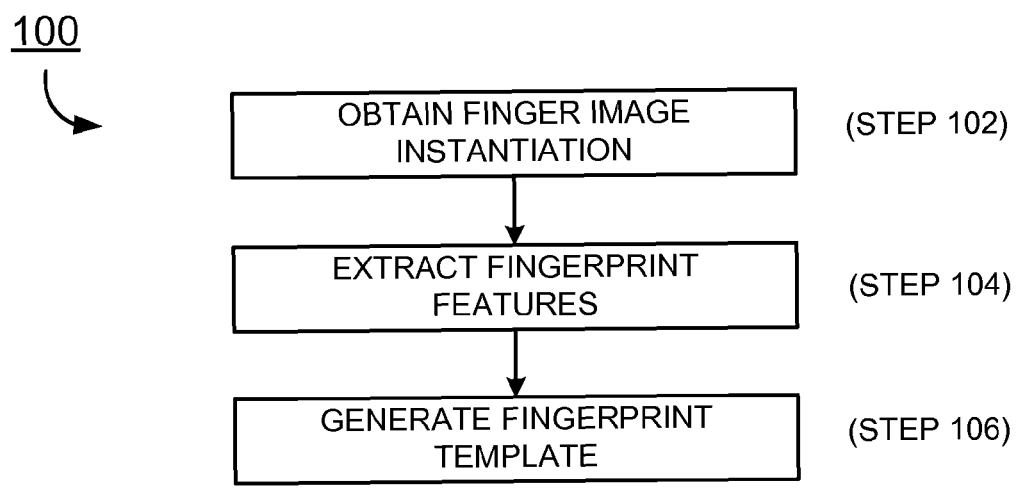
FIG. 4 is a flow chart of an embodiment of a general process of generating a fingerprint template.

FIG. 4 shows an embodiment of a general process 100 for generating a fingerprint template, which is an example of a biometric data record. The process 100 involves a method of image instantiation, where an image of a fingerprint is obtained (step 102), either from previously stored media or from a live imaging device (e.g., a scanner). A minutia extractor extracts (step 104) relevant fingerprint features and then formats (step 106) that data into a fingerprint template. The fingerprint template can then be stored to a file, and/or used as a concise substitute for the raw image in biometric applications.

Figure 5:
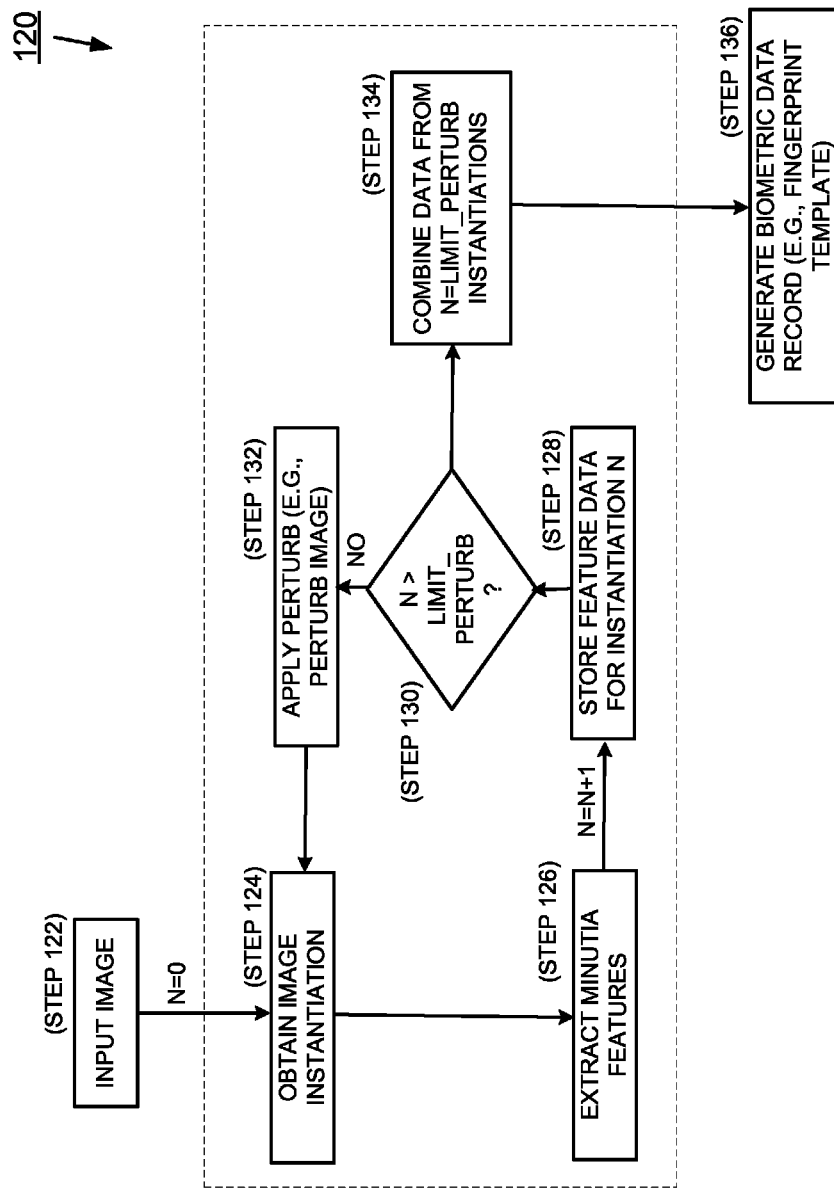
FIG. 5 is a flow chart of another embodiment of a process of generating a fingerprint template from multiple instantiations.
Figure 6:
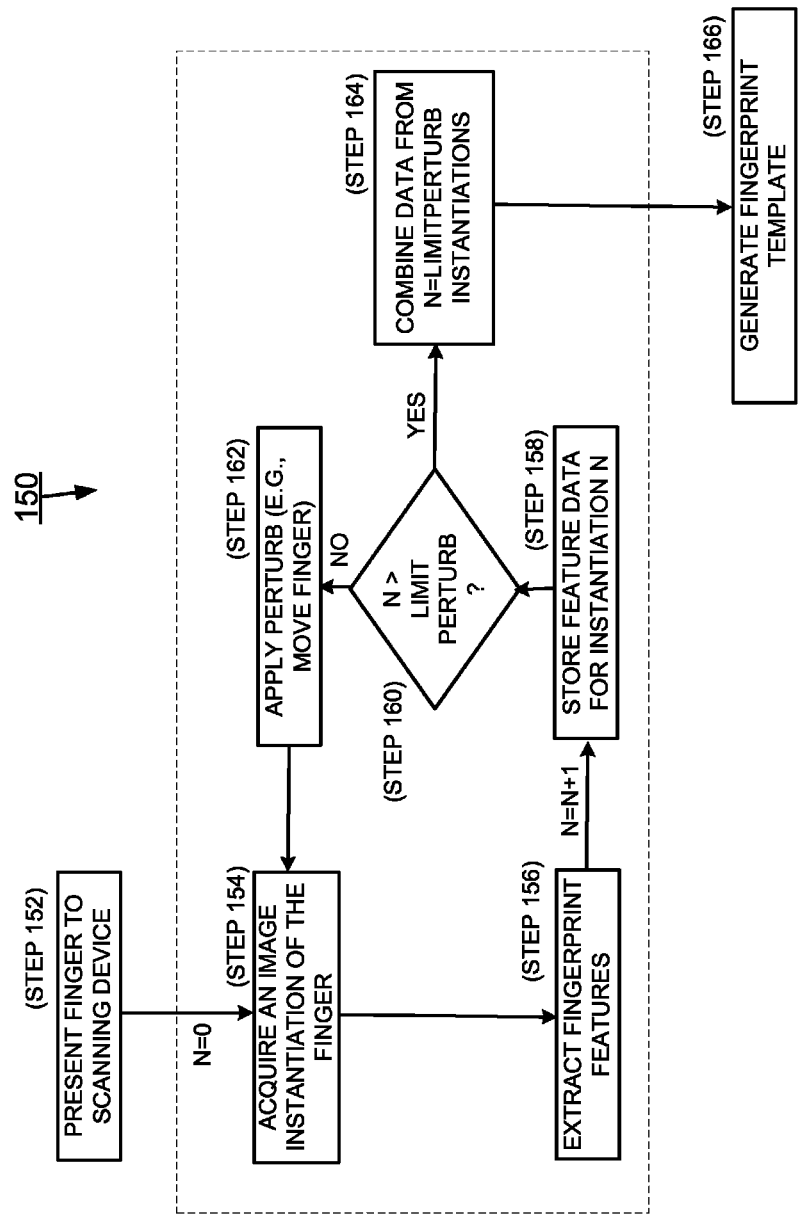
FIG. 6 is a flow chart of still another embodiment of a process of generating a fingerprint template from multiple instantiations.

FIG. 5 and FIG. 6 describe embodiments of processes for minutia extraction based on the analysis of multiple instantiations of the same fingerprint identity. In each described process, the merging of information obtained from the multiple instantiations produces robust, accurate, and repeatable minutia locations.

The general principles underlying the processes of FIG. 5 and FIG. 6 can be explained with an analogy. Consider a large rigid sheet with dimples throughout, each dimple corresponding to a feature in the fingerprint pattern that either is a true minutia point or looks like a true minutia point. Then place a small marble in each dimple where a minutia has been found by a minutia extraction algorithm. In some cases, however, there may be small marbles sitting on the lip of some of those dimples. These "empty" dimples represent minutiae that the initial minutia extraction algorithm does not locate.

Jostling the rigid sheet by a small amount represents a "perturbation" of the rigid sheet. Because most minutia extraction algorithms are sophisticated enough to be able to locate minutia despite small imperfections in the raw image data, most, if not all of the marbles will remain in their dimples, despite the perturbation, as a testament to the inherent stability and robustness of algorithm. In addition, a reasonable assumption is that the chances of a marble being dislodged from a dimple are much smaller than the chances of one falling into a dimple from the dimple's lip. Thus, when the rigid sheet is jostled, some of those marbles sitting on the lip may fall into their nearby dimples, resulting in new minutia detection.

To continue with this analogy, note that the dimples corresponding to true minutiae are "deeper" than the ones corresponding to false minutiae, because the false minutiae are not real structures, but a consequence of poor image formation. Consequently, perturbations are also likely to dislodge marbles in the shallow dimples (i.e., false minutia), essentially improving the likelihood of eliminating the detection of false minutiae. The exact type of perturbation is not as important as the amount of perturbation.

FIG. 5 shows an embodiment of a process 120 for extracting minutiae by applying simulated perturbations to a single image of a biometric identity. The biometric feature extraction device receives (step 122) an input image. The input image may be obtained from an existing database or file system or acquired in real time from an image-acquisition device, such as a scanner. Initially, the instantiation count is equal to zero (N=0). At step 124, the system obtains an instantiation of a biometric image. Features (fingerprint minutiae) of the biometric image are extracted (step 126) from the image instantiation. The instantiation count is incremented (N=N+1). The extracted feature data for the instantiation N are stored (step 128) in memory.

To determine whether to continue the process of feature extraction, the current instantiation count (N) is compared (step 130) to a value, which corresponds to the number of instantiations to be used in the generation of the data record. This particular number of instantiations can be predetermined or established dynamically (e.g., the user can continue to perform one more perturbation until further iterations appear to be having little or no influence on the output results). If this limit has not yet been reached, a simulated perturbation is applied (step 132) to the input image, and the process resumes at step 124, where another image instantiation is obtained. Simulated perturbations apply image-processing techniques to an image to simulate a change. Subsequent image perturbations can be applied to the original input image or to any image derived from the original input image by virtue of a perturbation.

Figure 7:
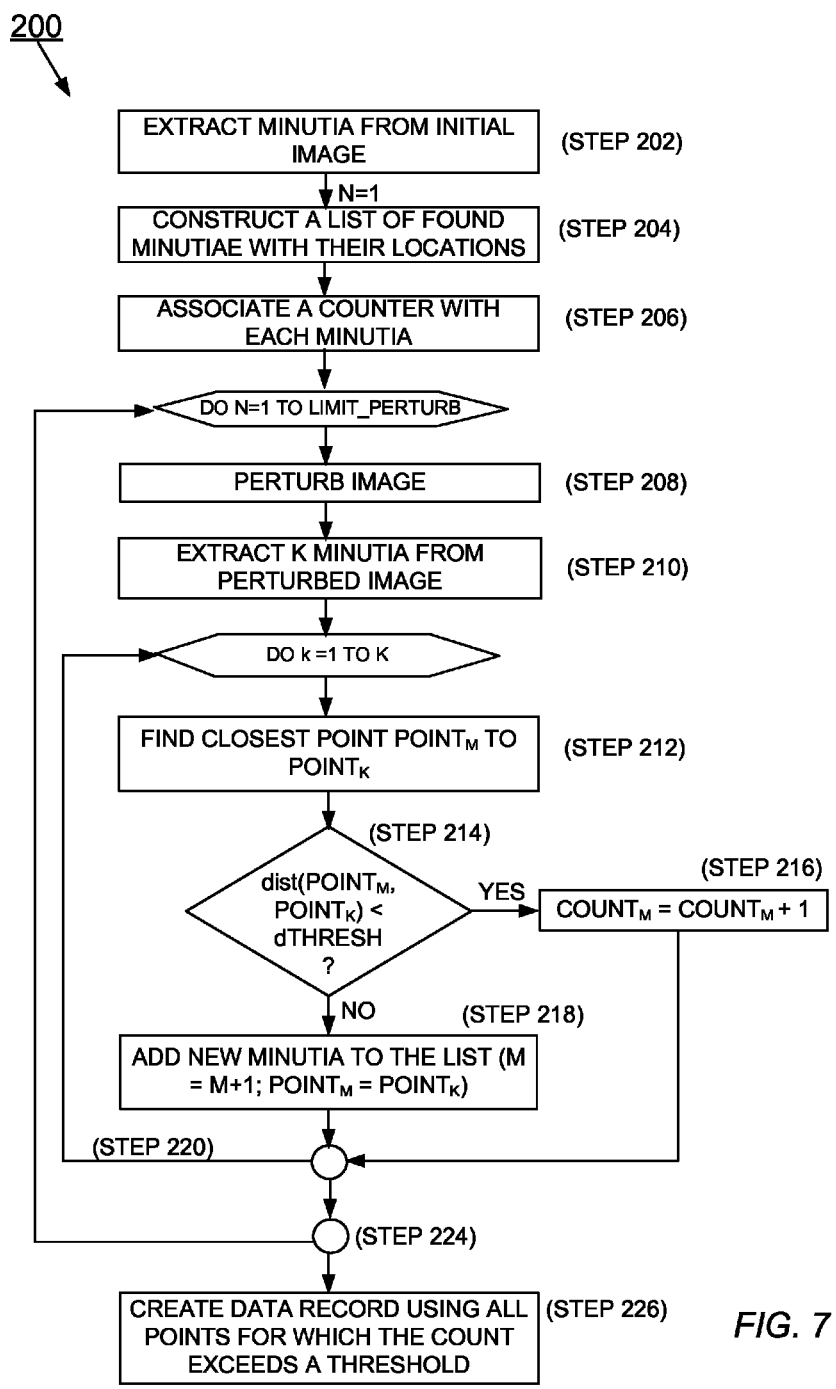
FIG. 7 is a flow chart of an embodiment of a process of merging feature extraction data taken from multiple instantiations into a fingerprint template.

When the number of instantiations reaches the limit, the feature data extracted from the N instantiations are merged (step 134), for example, as described in connection with FIG. 7. In response to this merged data, the biometric data record (e.g., a fingerprint template) is generated (step 136).

The biometric data record can be stored in a database, making it available for identity matching purposes. The various images themselves, from which the biometric data record derives, can be persistently saved or discarded.

FIG. 6 shows another embodiment of a process 150 for extracting minutiae by applying physical perturbations to the biometric identity during real-time image acquisition. Although described with reference to fingerprint, the principles of the process may extend to other types of biometric identities, such as eyes, handprints, thumbprints, palm prints, footprints, and faces. At step 152, a scanning device receives a finger. The instantiation count is initially equal to zero (N=0). An image instantiation of the finger is acquired (step 154. The biometric feature extraction device extracts (step 156) fingerprint features from the image instantiation, and the instantiation count increments (N=N+1). The biometric feature extraction device stores (step 158) the extracted fingerprint feature data for the instantiation N in memory. The instantiation count is compared (step 160) with a limit to determine whether another instantiation is to be used. As in FIG. 5, this limit can be predetermined or established dynamically. If the limit has not been reached, a physical perturbation is applied (step 162) to the finger. Examples of physical perturbations include, but are not limited to, finger movement, varied pressure applied by the finger, pupil dilation of an iris of an eye in response to modulated light directed at the eye, or the like. Other examples of perturbations can be to alter one or more parameters of a sensor used to acquire the images of the biometric identity, including, but not limited to, illumination intensity and acoustic signal strength. The process 150 continues at step 154, where another instantiation is obtained based on the image of the perturbed finger.

When the limit has been reached, the fingerprint feature data extracted from N instantiations are merged (step 164), for example, as described in connection with FIG. 7. A fingerprint template (i.e., biometric data record) is generated (step 136) from the merged fingerprint feature data. The fingerprint template can be stored in a database, available for identity fingerprint matching purposes. The various images themselves, from which the fingerprint template derives, can be persistently saved or discarded.

An important step of a biometric feature extraction process based on multiple instantiations of an image is the merging of the feature extraction data into a single biometric data record. FIG. 7 shows an embodiment of a process 200 for merging extraction data. To merge the data acquired from multiple perturbation feature extractions, a counter is associated with each minutia point (also referred to herein as a specific instance of a biometric feature). At step 202, minutia points are extracted from the initial image. The identities of found minutiae points (m=1 to M) and their locations (point$_m$) are stored (step 204) in a main initial list. A counter is associated (step 206) with each minutia, with all minutia counters initialized to 1. A perturbation is performed (step 208), and minutia points are extracted from the perturbed image. The locations (point$_k$) of these K extracted minutiae are stored (step 210).

With each perturbation, one of two events occurs: 1) the same minutia point is found again; or 2) a new minutia point is found. To determine whether a found K minutia point (point$_k$) is the same minutia point as a minutia point currently in the main list, the locations (point$_m$) of the M minutiae are compared (step 212) with the location (point$_k$) of the found K minutiae, to find the closest point$_m$ to that point$_k$. At step 214, the same minutia point is deemed to have been found for a given point$_k$ when the point$_k$ is within a small radius (dThresh) of a minutia point$_m$ currently in the list. The counter for this same minutia point$_m$ is incremented (step 216). If no minutia point$_m$ satisfies this distance criterion, the minutia point$_k$ is deemed new. The new minutia point$_k$ is (step 218) added to the main list (M=M+1; point$_m$=point$_k$) and its counter initialized to 1. The analysis is repeated (step 220) for each minutia point$_k$ found in the perturbed image.

At step 224, after the number of perturbations has reached the limit (limit perturb), the minutia points found most frequently from perturbation to perturbation will accumulate the highest counts. By setting a threshold (mergeThreshold), those minutia points with counts lower than the threshold are presumably false minutiae, whereas those equal to or above the threshold, being those most consistently extracted, are considered true minutiae. The minutia points falling below the threshold are removed from the list. This list of minutiae forms (step 226) the final list of minutiae from which the final biometric data record is constructed. Accordingly, the process operates to eliminate false identifications of minutiae while accentuating true identifications. Additionally, this threshold can be predetermined or tuned dynamically by a user.

In addition, the final counts for those minutiae above the threshold can be used to establish a confidence level for each of the minutia points, with higher counts corresponding to higher levels of confidence that such minutiae are, in fact, true minutiae. Conversely, the counts of those minutia points that fall below the threshold can be used to establish a confidence level for each of the false minutia, with lower counts corresponding to higher levels of confidence that such minutiae are actually false minutiae (or with higher counts below the threshold corresponding to lower levels of confidence that such minutiae are actually false minutiae).

Figure 8:
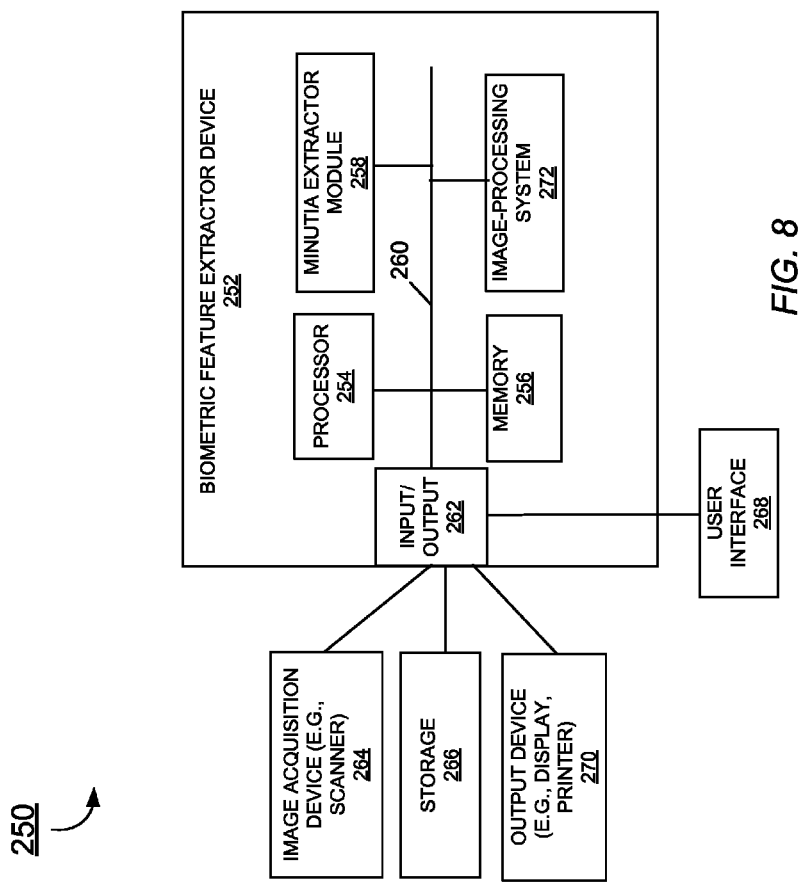
FIG. 8 is a functional block diagram of a processor-based device that can perform biometric feature extraction based on multiple different images of the biometric identity and produce therefrom a data record.

FIG. 8 shows an embodiment of a biometric feature extraction system 250 having a biometric feature extraction device 252 comprised of a processor 254, memory 256, and a minutia extractor module 258 in communication over a communication bus 260. The biometric feature extraction device 252 has an I/O module 262 for receiving input in the form of digital images from various sources including an image acquisition device 264, such as a scanner, and storage 266. Under the control of the processor 254, the minutia extractor module 258 finds and extracts minutiae from digital images received by the biometric feature extraction device 252 through the I/O module 262. In one embodiment, the minutia extractor module 258 is adapted for fingerprint analysis, to detect and extract specific fingerprint features.

A user can supply commands to the biometric feature extraction device 252 through a user interface 268. Graphic results produced by the biometric feature extraction device 252 can be output to an output device 270, such as a display screen, printer (which may or may not be part of the device 252). Data records (e.g., fingerprint data templates) produced by the biometric feature extraction device 252 can be stored in the storage 266. The biometric feature extraction device 252 can also include an image-processing module 272 configured to apply image-processing techniques to digital images in order to produce synthetic perturbations of an image.

The described methods can be implemented on an image-processing device, fingerprint-processing device, or the like, or on a separate programmed general-purpose computer having image processing capabilities. Additionally, the methods of this invention can be implemented on a special-purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the image processing system according to this invention.

Furthermore, the disclosed methods may be readily implemented in software using objector object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

It is, therefore, apparent that there has been provided systems and methods for improving the robustness, accuracy, and repeatability of minutia extraction from digital fingerprint images by combining information from the analysis of multiple instantiations of the same fingerprint identity. While these principles have been described in conjunction with a number of embodiments, it is evident that many alternatives, modifications, and variations would be or are apparent to those of ordinary skill in the applicable arts. Accordingly, it is intended to embrace all such alternatives, modifications, equivalents, and variations that are within the spirit and scope of the invention.

What is claimed is:

1. A method of extracting biometric features from images of a biometric identity, the method comprising:
   obtaining or generating multiple variations of a single image instantiation for the biometric identity to one or more of: increase detection of true minutiae, reduce detection of false minutiae, and improve the consistency feature extraction, wherein a limit governs how many variations are used;
   identifying specific instances of biometric features in each of the multiple variations of the single image instantiation of the same biometric identity; and
   statistically merging common feature data, corresponding to the specific instances of biometric features identified and determined to be at a same location in the multiple different variations of the single image instantiation of the same biometric identity, into a single biometric data template representation of the biometric identity, wherein the merging of the common feature data includes identifying found minutia points, associating a counter with each found minutia point, and storing a location of each found minutia point, and when the limit has been reached, determining based on a threshold compared to a count, which are true minutiae.

2. The method of claim 1, further comprising counting the specific instances of biometric features identified and determined to be at the same location in the multiple different variations of the single image instantiation of the same biometric identity.

3. The method of claim 2, wherein obtaining multiple variations further includes physically changing a position of the biometric identity during image acquisition.

4. The method of claim 2, wherein obtaining multiple variations further includes physically deforming the biometric identity during image acquisition.

5. The method of claim 2, wherein obtaining multiple variations further includes altering one or more parameters of a sensor used to acquire the multiple images.

6. The method of claim 2, obtaining multiple variations further includes simulating a change in a previously acquired image of the biometric identity using the image processing technique.

7. The method of claim 1, wherein one of the multiple images is acquired in response to physically perturbing a position of the biometric identity and another of the multiple images is acquired in response to simulating a change in a previously acquired image of the biometric identity using an image processing technique.

8. The method of claim 1, further comprising:
maintaining the count for each of the same identified specific instances of a biometric feature, the count for a given specific instance corresponding to a number of the multiple different images in which that specific instance is identified; and
generating the biometric data record comprised of each specific instance of a biometric feature having a count that meets a threshold criterion.

9. The method of claim 8, further comprising associating a confidence level with one or more of the identified specific instances of biometric features based on the count associated with each identified specific instance of that one or more of the identified specific instances.

10. The method of claim 1, wherein the identified specific instances of biometric features are minutiae of fingerprints.

11. A non-transitory computer readable information storage media having stored thereon instructions, that when executed by a processor, cause to be performed a method for extracting biometric features from images of a biometric identity comprising:
obtaining or generating multiple variations of a single image instantiation for the biometric identity to one or more of: increase detection of true minutiae, reduce detection of false minutiae, and improve the consistency feature extraction, wherein a limit governs how many variations are used;
identifying specific instances of biometric features in each of the multiple variations of the single image instantiation of the same biometric identity; and
statistically merging common feature data, corresponding to the specific instances of biometric features identified and determined to be at a same location in the multiple variations of the single image instantiation of the same biometric identity, into a single biometric data template representation of the biometric identity, wherein the merging of the common feature data includes identifying found minutia points, associating a counter with each found minutia point, and storing a location of each found minutia point, and when the limit has been reached, determining based on a threshold compared to a count, which are true minutiae.

12. The media of claim 11, further comprising counting the specific instances of biometric features identified and determined to be at the same location in the multiple different variations of the single image instantiation of the same biometric identity.

13. The media of claim 12, wherein obtaining multiple variations further includes altering one or more parameters of a sensor used to acquire the multiple images.

14. The media of claim 12, wherein one of the multiple images is acquired in response to physically perturbing a position of the biometric identity and another of the multiple images is acquired in response to simulating a change in a previously acquired image of the biometric identity using an image processing technique.

15. The media of claim 11, further comprising:
maintaining the count for each identified specific instance of a biometric feature, the count for a given specific instance corresponding to a number of the multiple different images in which that specific instance is identified; and
generating the biometric data record comprised of each specific instance of a biometric feature having a count that meets a threshold criterion.

16. The media of claim 15, further comprising associating a confidence level with one or more of the identified specific instances of biometric features based on the count associated with each identified specific instance of that one or more of the identified specific instances.

17. The media of claim 11, wherein the biometric features identified in the multiple images of the same biometric are minutiae of fingerprints.

18. A system that extracts biometric features from images of a biometric identity, comprising:
a processor obtaining or generating multiple variations of a single image instantiation for the biometric identity to one or more of: increase detection of true minutiae, reduce detection of false minutiae, and improve the consistency feature extraction, wherein a limit governs how many variations are used;
a biometric feature extraction device including a memory interconnected with a processor, the processor programmed to run computer readable program code that identifies, when executed, specific instances of biometric features in each of the multiple variations of the single image instantiation of the same biometric identity and statistically merges common feature data corresponding to the identified specific instances of biometric features determined to be at a same location into a single biometric data template representation of the biometric identity, wherein the merging of the common feature data includes identifying found minutia points, associating a counter with each found minutia point, and storing a location of each found minutia point, and when the limit has been reached, determining based on a threshold compared to a count, which are true minutiae; and
the memory configured to store a list of specific instances of biometric features that are being merged into the template.

19. The system of claim 18, wherein the computer readable program code further comprises:

computer readable program code configured to associate, if executed, a counter with each specific instance of a biometric feature in the list;

computer readable program code configured to count, if executed, a number of the multiple different image instantiations in which each of the same specific instances of a biometric feature is identified; and computer readable program code configured to discard, if executed, each specific instance of a biometric feature from the list having a count below a threshold after the specific instances of biometric features are merged; and computer readable program code configured to generate, if executed, the record comprised of the specific instances of biometric features remaining in the list after discarding each specific instance of a biometric feature from the list having a count below the threshold.

20. The system of claim 18, further comprising counting the specific instances of biometric features identified and determined to be at the same location in the multiple different variations of the single image instantiation of the same biometric identity.

21. The system of claim 20, wherein obtaining multiple variations further includes a change in one or more parameters of a sensor used to acquire the multiple different images.

22. The system of claim 18, wherein a perturbation to a first one of the multiple different images produces a second one of the multiple different images.

23. The system of claim 22, wherein obtaining multiple variations uses an image processing technique to change a first one of the multiple images into a second one of the multiple images.

24. The system of claim 18, wherein the computer readable program code further comprises computer readable program code configured to associate, if executed, a confidence level with one or more of the specific instances of biometric features in the list based on the count associated with that specific instance of a biometric feature.

25. The system of claim 18, wherein the specific instances of biometric features identified in the multiple variations of the single image instantiations of the same biometric are minutiae of fingerprints.

26. The system of claim 18, wherein the input/output module is interconnected with one or more of an image acquisition device, a scanner, an output device, a display, a printer and storage.

* * * * *